United States Patent [19]

Sugimoto et al.

[11] Patent Number: 5,479,065
[45] Date of Patent: Dec. 26, 1995

[54] METAL HALIDE DISCHARGE LAMP SUITABLE FOR AN OPTICAL LIGHT SOURCE HAVING A BROMINE TO HALOGEN RATIO OF 60–90%, A WALL LOAD SUBSTANTIALLY GREATER THAN 40 W/CM$^2$, AND A D.C. POTENTIAL BETWEEN THE ANODE AND CATHODE

[75] Inventors: Takahiro Sugimoto; Akihiro Ueda; Tadatoshi Higashi, all of Yokohama, Japan

[73] Assignee: Toshiba Lighting & Technology Corporation, Tokyo, Japan

[21] Appl. No.: 174,066

[22] Filed: Dec. 28, 1993

[30] Foreign Application Priority Data

Dec. 28, 1992 [JP] Japan ................... 4-349506

[51] Int. Cl.$^6$ ............ H01J 5/16; H01J 17/20; H01J 61/20; H05B 37/00
[52] U.S. Cl. ............ 313/113; 313/638; 313/639; 313/640; 313/642; 315/200 R
[58] Field of Search ................ 313/571, 638, 313/639, 640, 642, 643; 315/200 R, 205, 313, 112, 113

[56] References Cited

U.S. PATENT DOCUMENTS

| | | | |
|---|---|---|---|
| 3,452,238 | 6/1969 | Larson | 313/571 |
| 3,566,178 | 2/1971 | Mori | 313/639 |
| 3,798,487 | 3/1974 | Zollweg et al. | 313/571 |
| 4,232,243 | 11/1980 | Rigden | 313/634 |
| 4,647,814 | 3/1987 | Dobrusskin et al. | 313/641 |
| 4,935,668 | 6/1990 | Hansler et al. | 315/82 |
| 5,107,165 | 4/1992 | Dever et al. | 313/25 |
| 5,135,300 | 8/1992 | Toide et al. | 353/31 |
| 5,192,891 | 3/1993 | Matsuura et al. | 313/639 |

FOREIGN PATENT DOCUMENTS

| | | | |
|---|---|---|---|
| 3-95849 | 4/1991 | Japan | 313/638 |
| 89/07877 | 8/1989 | WIPO | 315/200 R |

*Primary Examiner*—William L. Sikes
*Assistant Examiner*—Walter J. Malinowski
*Attorney, Agent, or Firm*—Cushman, Darby & Cushman

[57] ABSTRACT

A metal halide discharge lamp operated from a D.C. power source, which is suitable for an optical light source, has a quartz arc tube. Anode and cathode electrodes are disposed in the arc tube. The gap length between electrodes is so short that the metal halide discharge lamp functions as a point light source. The arc tube contains an inert gas, mercury and metal halide additives including metal bromine. By utilizing the catephoresis effects, the transformation of silica ($SiO_2$) of the arc tube to cristobalite or the formation of an opaque substance on the arc tube is prevented. Atomic percent of bromine to halogen contained in the arc tube is about 60% to 90% and a wall load developed in the arc tube is substantially greater than 40 W/cm$^2$.

24 Claims, 3 Drawing Sheets

(54) METAL HALIDE DISCHARGE LAMP SUITABLE FOR AN OPTICAL LIGHT SOURCE HAVING A BROMINE TO HALOGEN RATIO OF 60–90%, A WALL LOAD SUBSTANTIALLY GREATER THAN 40 W/CM$^2$, AND A D.C. POTENTIAL BETWEEN THE ANODE AND CATHODE

BACKGROUND OF THE INVENTION

1. Field of the Invention

The present invention relates to a discharge lamp especially suited for a forward lighting application of an optical apparatus and more particularly, to a metal halide discharge lamp operating from a D.C. power source suited for an optical light source of an projector device such as a projection color display apparatus.

2. Description of the Related Art

Recently, it has been proposed to utilize a metal halide discharge lamp as a light source for a projection color display apparatus. U.S. Pat. No. 5,135,300 discloses a projection color display apparatus in which a metal halide lamp as a white light source is assembled. The light source uses a parabolic reflecting mirror having a concave surface so as to converge the light flux emitted from the light source with efficiency and to obtain parallel rays. The light source is made as close to a point source as possible and it is mounted within the reflecting mirror so as to coincide the focal point of the reflecting mirror with the center of the light output from the light source. The metal halide discharge lamp has a pair of electrodes, and the gap length between the electrodes is shorter than conventional metal halide discharge lamps used for general illumination purpose such as street lights and flood lights. The discharge lamp disclosed in the patent is called a short arc metal halide discharge lamp.

As for metal halide additives filled in an arc tube of a metal halide discharge lamp, dysprosium iodide, indium iodide, thallium iodide and cesium iodide are known to efficiently produce red, green and blue components of the light. In operation of such a metal iodide discharge lamp, all of mercury is vaporized, resulting in a high-pressure, wall-stabilized arc in a gas consisting principally of mercury vapor at several atmospheres pressure. The iodides also evaporate from the arc tube walls, the iodine molecules diffusing into the high-temperature arc column, where they dissociate. The metal atoms are ionized and excited and give off their own characteristic spectral lines. As metal atoms diffuse back to the walls, they encounter iodine atoms in the cooler gas near the walls and recombine to reform the iodine molecules.

When a short arc metal halide discharge lamp is operated, the power consumption of the arc column or the wall load of the lamp defined the power consumed by the arc column pep inside wall surfaces of the arc tube (W/cm$^2$) becomes extremely high to raise the wall temperature of the arc tube almost to its melting point, and metal ions of the additives, such as metal ions of rare-earth metals or metal ions of alkali metals react with silica (SiO$_2$) of the arc tube considerably to lose the transparency of the arc tube. It is assumed that silica at the high temperature tube walls exposed by the metal ions tends to be transformed its crystalline structure to a cristobalite known as an opaque substance easily. Such transformation firstly occurs at the hottest wall areas after 100 hours operation. Loss of the transparency spreads over the other wall areas and the whole wall areas are finally covered with the opaque substance. After 1000 hour-operation, the inside walls of the arc tube is observed as if white refractory materials are deposited thereon, and the transparency of the arc tube is almost lost. A metal halide discharge lamp having such a non-transparent arc tube is no longer used for a point light source because the arc tube diffuses the light emitted from by the arc column.

In a metal halide lamp operated from a direct current (D.C.) power source, it typically experiences the effects of catephoresis which cause the halides of the metal halide discharge lamp to be moved or swept into the end regions of the lamp so as not to contribute to providing the desired illumination of such lamp. Conventionally, it has been tried to reduce the detrimental effects of catephoresis as disclosed in U.S. Pat. No. 4,935,668.

It is an object of the present invention to provide an improved metal halide discharge lamp operating from a D.C. power source, which is suitable for a point light source.

It is another object of the present invention to provide a metal halide discharge lamp operating from a D.C. power source which utilizes the catephoresis effects to prevent loss of transparency of an arc tube of the lamp.

It is further object of the present invention to provide a metal halide discharge lamp operating from a D.C. power source which has a high luminous efficacy and long operating life.

It is still further object of the present invention to provide a color display device in which an optical light source mounting a metal halide discharge lamp operating from a D.C. power source.

SUMMARY OF THE INVENTION

The objects are achieved by a metal halide discharge lamp having a quartz arc tube in which a pair of electrodes is disposed. The electrodes comprising of anode and cathode electrodes are separated from each other by a predetermined distance. A D.C. potential is applied between the anode and the cathode from an external power source and an arc discharge is developed between the electrodes. The arc tube contains an inert gas, mercury and metal halide additives including metal bromine. Atomic percent of bromine to halogen contained in the arc tube is about 60% to 90% and a wall load developed in the arc tube is substantially greater than 40 W/cm$^2$.

BRIEF DESCRIPTION OF THE DRAWINGS

The accompanying drawings, which consititute a part of the specification, illustrate a presently preferred embodiment of the invention.

DETAILED DESCRIPTION OF THE PREFERRED EMBODIMENTS

Figure 1:
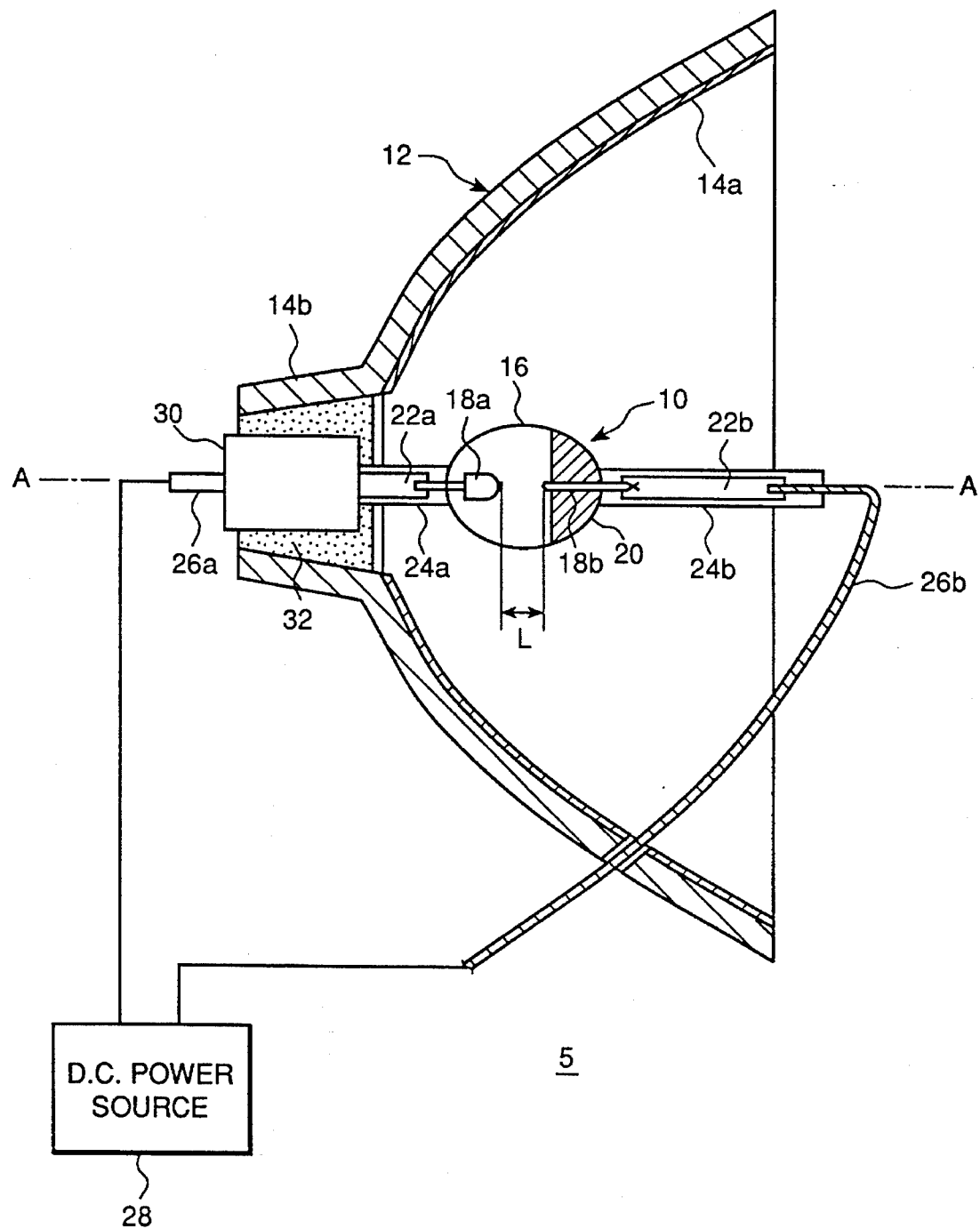
FIG. 1 is a side view generally illustrating an optical light source having a metal halide discharge lamp disposed inside a reflector, in accordance with the present invention.

FIG. 1 is a side view generally illustrating an optical light source 5 having a metal halide discharge lamp 10 according to the present invention. Metal halide lamp 10 is disposed inside a reflector 12. Reflector 12 has a light reflecting section 14a provided thereon so as to converge the light flux from metal halide discharge lamp 10 and to project parallel rays. Reflector 12 has a recessed section 14b for fixing metal halide discharge lamp 10 therein. Reflector 12 is made of glass, however it may be made of metals. Light reflecting section 14a is formed with optical interference films comprising of alternating layers of titanium and silica for high temperature use.

An arc tube 16 of metal halide discharge lamp 10 is made of quartz glass and formed substantially in spheroidal shape. An anode electrode 18a and a cathode electrode 18b are opposedly disposed at each ends of arc tube 16. Electrodes 18a, 18b are separated from each other by a predetermined distance (L). In order to obtain a point light source, the distance or the gap length between electrodes 18a, 18b is less than 15 mm. Each electrodes 18a, 18b are rod-like members made of tungusten containing thorium oxide, also known as thoriated tungsten. Anode electrode 18a has larger diameter than cathode electrode 18b for a desirably greater heat dissipation therefrom when operated with a direct current power:source, although electrodes of the same size are generally selected for lamp operation with alternating current power source.

Metal halide discharge lamp 10 is so oriented in a horizontal manner relative to along an optical axis A—A of reflector 12 that each electrodes 20a, 20b are placed on axis A—A. Reflector 12 has a predetermined focal point along axis A—A and a light emitting portion developed by the discharge between electrodes 18a, 18b are positioned on the focal point. An infrared alumina coating 20, which substantially surrounds cathode electrode 18b, is formed inside arc tube 16. Infrared coating 20 also serves to be a light-reflective shield. Electrodes 18a, 18b are respectively welded to foil members 22a, 22b made of molybdenum and sealed in neck portions 24a, 24b of arc tube 18. In lead wires 26a, 26b, which are capable of being connected to an external D.C. power source 28 are electrically connected to foil members 22a, 22b.

A base member 30 which holds neck portion 24a and secures the electrical contact between lead wire 26a and foil member 22a, is disposed in recessed section 14b of reflector 12. Recessed section 14b is filled with adhesive materials 32 so that base member 30 is fixed therein.

In the first embodiment of metal halide discharge lamp 10 for 250 W (Wall load: 50 W/cm$^2$), spheroidal arc tube 16 has the wall thickness of 1.4 mm and the volume of about 0.9 cc. The major axis and the minor axis of spheroidal arc tube 16 are 15 mm and 10.5 mm, respectively. The gap length between anode electrode 18a and cathode electrode 18b is about 6 mm. Anode electrode 18a has its diameter of 1.6 mm while cathode electrode 18b has its diameter of 0.6 mm. Metal halide discharge lamp 10 contains in its arc tube 16 are mercury of about 20 mg, argon gas of 300 Torr at room temperature and metal halide additives shown in Table 1. Atomic percent of bromine to halogen in arc tube 16 is about 86.6%. Metal halide;discharge lamp 10 thus constructed attains a luminous effficacy of 80 1 m/W and a color temperature of 7500° K.

TABLE 1

| Metal halide fills | |
| --- | --- |
| Dysprosium bromine (DyBr$_3$) | 1.0 mg |
| Dysprosium iodine (DyI$_3$) | 0.37 mg |
| Cesium iodine (CsI) | 0.125 mg |
| Tin bromine (SnBr$_2$) | 0.6 mg |
| Indium bromine (InBr) | 0.22 mg |

TABLE 1-continued

| Metal halide fills | |
| --- | --- |
| Thallium bromine (TlBr) | 0.4 mg |

In the second embodiment of metal halide discharge lamp 10 for 180 W (Wall load 50 W/cm$^2$), spheroidal arc tube 16 has the wall thickness of 15 mm and the volume of about 0.5 cc. The major axis and the minor axis of spheroidal arc tube 16 are 10 mm and 9.0 mm, respectively. The distance between anode electrode 18a and cathode electrode 18b is about 5 mm. Anode 18a has its diameter of 1.2 mm while cathode electrode 18b has its diameter of 0.5 mm. Metal halide discharge lamp 10 contains in its arc tube 16 are mercury of about 13 mg, an argon gas of 300 Tort at room temperature and metal halide additives shown in Table 2. Atomic percent of bromine to halogen in arc tube 16 is about 67%. Metal halide discharge lamp 10 thus constructed attains a luminous effficacy of 80 1 m/W.

TABLE 2

| Metal halide fills | |
| --- | --- |
| Dysprosium bromine (DyBr$_3$) | 0.5 mg |
| Neodymium iodine (NdI$_3$) | 0.375 mg |
| Cesium iodine (CsI) | 0.125 mg |
| Tin bromine (SnBr$_2$) | 0.2 mg |
| Indium bromine (InBr) | 0.22 mg |
| Thallium bromine (TlBr) | 0.4 mg |

In the embodiments or examples of the metal halide discharge lamp according to the invention, the catephoresis effect is turned to be an advantageous. Ionized metals of metal halides in arc tube 16 are attracted toward cathode 18b where negative potential is applied from D.C. source 28 and they are retained near cathode electrode 18b. It is presumed that a chance for the ionized metals to attack the arc tube walls and react with silica contained in the arc tube, particularly the upper center arc tube wall or the arc tube walls facing to anode electrode 18a is reduced. The ionized metals are thus kept away from high temperature regions of arc tube 16. This prevents transformation of the silica to a cristobalite or formation of an opaque substance on arc tube 16. Transparency of arc tube 16 is thus maintained during the life time of metal halide discharge lamp 10. Even the transformation is caused to form the opaque substance on the arc tube walls facing to cathode electrode 18b is caused due to the attracted metal ions, the rest of walls of arc tube 16 are kept clear to transmit the light emitted by the discharge to reflector 12 therethrough and the light emitted from near cathode 18 is reflected back to reflector 12 through the clear arc tube wall with aid of infrared coating 20. An excellent point light source having a high luminous efficacy is obtained.

Figure 2:
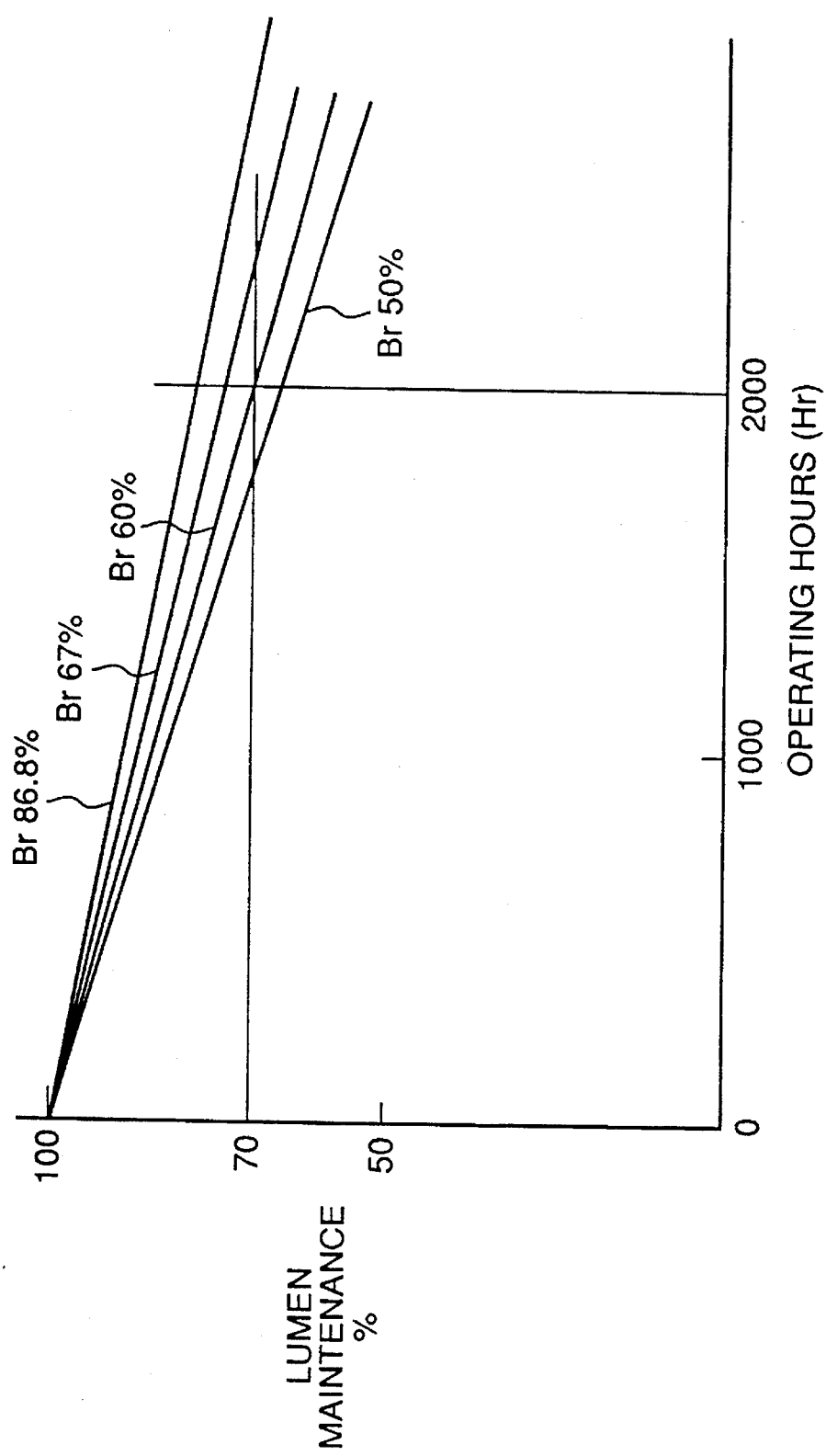
FIG. 2 is a graph showing lumen maintenance ratio of the metal halide discharge lamps as a function of operation hours and atomic percent of bromide to halogen contained in an arc tube of the metal halide lamp.

FIG. 2 is a graph showing lumen maintenance ratio of various metal halide discharge lamps as a function of atomic percent of bromide to halogen contained in the arc tube. To attain more than 70% lumen maintenance after 2000 hours operation, atomic percent of bromide to halogen is preferably selected between 60% and 90%. If atomic percent of bromide to halogen is more than 90%, the light emission itself is decreased considerably and the color rendition becomes poor.

In the metal halide discharge lamp according to the present invention, a halogen cycle is performed as done in a conventional metal halide discharge lamp and bromide functions as means for transporting tungsten back to anode electrode 18a. Bromide is more active than iodide, however erosion of anode electrode 18a caused thereby is not detrimental if the atomic percent of bromide to halogen is within a prescribed range because the diameter of anode electrode 18a is larger than electrodes of a conventional metal halide discharge lamp operated from an A.C. power source as described above.

Figure 3:
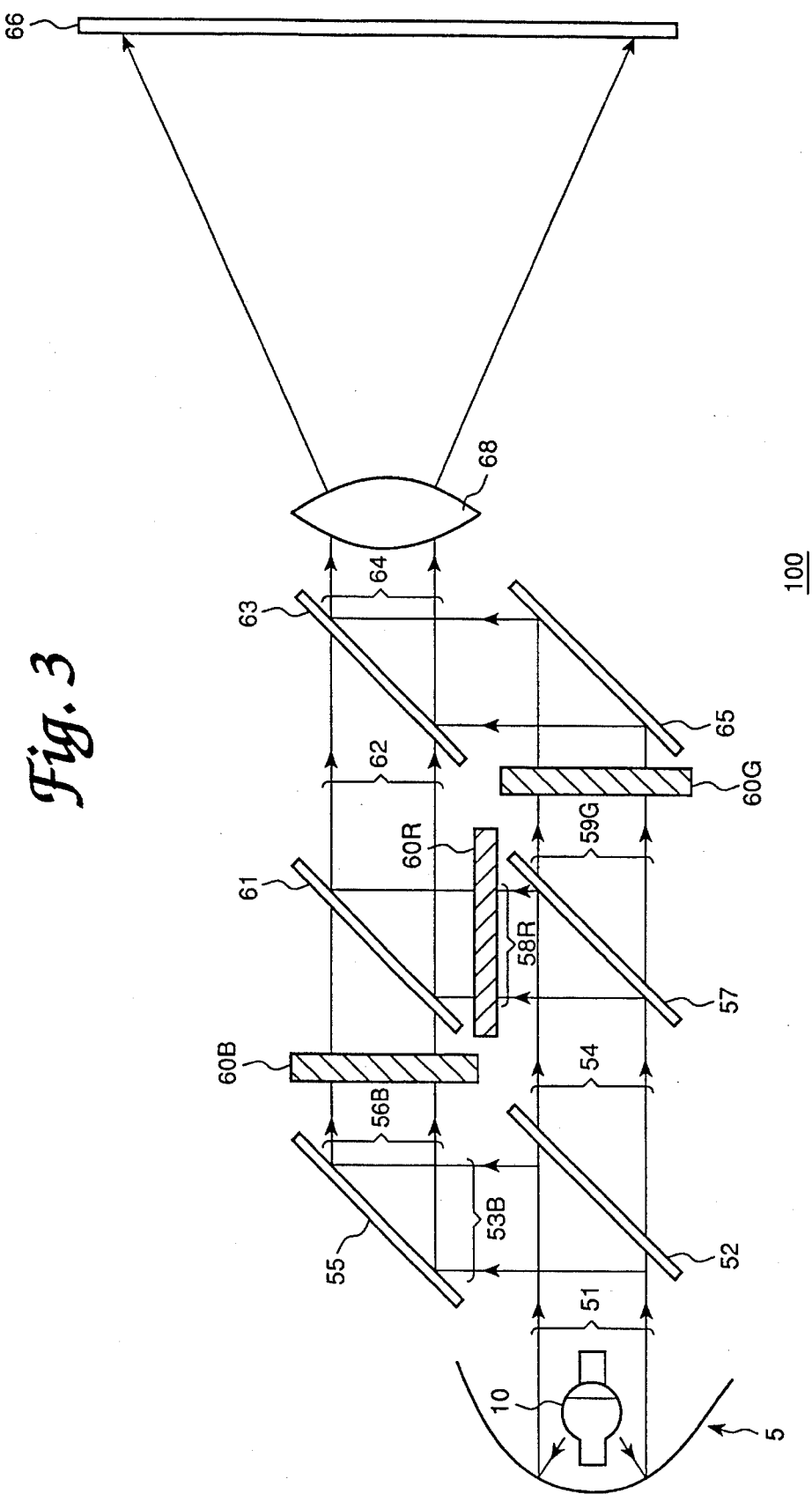
FIG. 3 is a diagrammatic view of a LCD color display device in which the optical light source is assembled.

Metal halide discharge lamp 10 is utilized for a projection color display apparatus as a point light source. FIG. 3 is a diagrammatic view of a LCD color display device 50 in which optical light source 5 is assembled. Metal halide discharge lamp 10 in optical light source 5 emits a white light flux 51. A dichroic mirror 52, which has a wavelength selectivity for reflecting a blue light flux 53B and transmitting a mixed light flux 54 of red and green light fluxes, is provided in the path for light flux 51. In the path for blue light flux 53B, a reflecting mirror 55 is provided which reflects the blue light flux 53B as a light flux 56B. In the path for the light flux 54, a dichroic mirror 57 is provided which has a wavelength selectivity for reflecting a red light flux 58R and transmitting a green light flux 59G. In the paths for the light fluxes 56B, 58R and 59G, transmission light valves 60B, 60R and 60G are respectively provided. Each of light valves 60B, 60R and 60G is constituted by a liquid crystal device and they are driven or modulated in accordance with TV signals or the like. Modulated light fluxes 56B and 58R from light valves 60B and 60R are respectively directed to a dichroic mirror 61. Dichroic mirror 61 transmits modulated light flux 56B and reflects modulated light flux 58R, thereby forming a light flux 62 which is a mixture of modulated light fluxes 56B and 58R. A dichroic mirror 63 transmits light flux 62 and reflects modulated light flux 59G, thereby forming a light fluxe 64 which is a mixture of light fluxes 59G and 62. A mirror 65 is provided to reflect modulated light flux 59G to mirror 63. Light flux 64 is projected to a screen 66 through a projection lens 68.

Metal halide dishcarge lamp according to the invention has a high luminous efficacy and long life, but it eliminates color shading occured at center and pheripheral areas of images projected on a screen if utilized for a ligth source of a color display device.

While there have been shown and described what are at present considered the preferred embodiments of the invention, it will be obvious to those skilled in the art that various changes and modifications may be made therein without departing from the scope of the invention as defined by the appended claims.

What is claimed is:

1. Metal halide discharge lamp suitable for an optical light source comprising:

a quartz arc tube;

a pair of electrodes disposed within said tube, said electrodes comprising an anode electrode and a cathode electrode separated from each other by a predetermined distance and said anode electrode having a larger diameter than said cathode electrode;

said arc tube containing an inert gas, mercury and a metal halide fill including metal bromine, wherein the atomic percent of bromine to halogen contained in said quartz arc tube is about 60% to 90% and a wall load developed in said quartz arc tube is substantially greater than 40 W/cm$^2$, and means for providing a D.C. potential between said anode and cathode electrodes whereby ionized metals of said metal halide fill in said quartz arc tube are attracted toward and retained near said cathode electrode, resulting in maintained transparency of a wall of said quartz arc tube.

2. Metal halide discharge lamp according to claim 1, wherein said metal halide fill includes at least one metal selected from the group consisting of dysprosium, indium, thallium, neodymium, tin and cesium.

3. Metal halide discharge lamp according to claim 1, wherein said metals bromine of said metal halide fill includes at least dysprosium bromine and tin bromine.

4. Metal halide discharge lamp according to claim 1, wherein said metal halide fill further includes metal iodine in addition to metal bromine and the atomic percent of iodine to halogen other than bromine contained in said arc tube is more than 90%.

5. An optical light source comprising:

a metal halide discharge lamp including a quartz arc tube,
   said quartz arc tube having a pair of electrodes disposed within said tube, said electrodes comprising an anode electrode add a cathode electrode separated from each other by a predetermined distance and said anode electrode having a larger diameter than said cathode electrode, wherein a wall load developed in said quartz arc tube is substantially greater than 40 W/cm$^2$, and means for providing a D.C. potential between said anode and cathode electrodes from an external power source therethrough, said quartz arc tube containing an inert gas, mercury and a metal halide fill including metal bromine, wherein the atomic percent of bromine to halogen contained in said quartz arc tube is about 60% to 90%; and a reflector having a predetermined focal length and means capable of being connected to said external power source, wherein said metal halide discharge lamp is positioned within said reflector so as to be approximately disposed near said focal length of said reflector.

6. An optical light source according to claim 5, wherein said metal halide discharge lamp is horizontally positioned within said reflector so that said anode and cathode electrodes substantially coincide with a horizontal axis of said reflector.

7. An optical light source according to claim 6, wherein said metal halide fill includes at least one metal selected from the group consisting of dysprosium, indium, thallium, neodymium, tin and cesium.

8. An optical light source according to claim 6, wherein said metal bromine of said metal halide fill includes at least dysprosium bromine and tin bromine.

9. An optical light source according to claim 6, wherein said metal halide fill further includes metal iodine in addition to metal bromine and the atomic percent of iodine to halogen other than bromine contained in said quartz arc tube is more than 90%.

10. A color display device having a metal halide discharge lamp as an optical light source including red, green and blue light components for projecting a color image on a screen comprising, means for optically filtering the red, green and blue light components, means for modulating each of the light components with an image signal and producing modulated signals, and means for optically synthesizing the modulated signals, wherein said metal halide discharge lamp includes a quartz arc tube, said quartz arc tube having a pair of electrodes disposed within said tube, said electrodes having an anode electrode and a cathode electrode separated from each other by a predetermined distance and said anode electrode having a larger diameter than said cathode electrode;

said quartz arc tube containing an inert gas, mercury and a metal halide fill including metal bromine, wherein the atomic percent of bromine to halogen contained in said quartz arc tube is about 60% to 90% and a wall load developed in said quartz arc tube is substantially greater than 40 W/cm$^2$; and means for providing a D.C. potential between said anode and cathode electrodes from an external power source therethrough.

11. An optical light source comprising:

a metal halide discharge lamp including a quartz arc tube, said quartz arc tube having a pair of electrodes disposed within said tube, said electrodes comprising an anode electrode and a cathode electrode separated from each other by a distance less than 15 mm, wherein a wall load developed in said quartz arc tube is substantially greater than 40 W/cm$^2$, and means for providing a D.C. potential between said anode and cathode electrodes from an external power source therethrough, said quartz arc tube containing an inert gas, mercury and a metal halide fill including metal bromine, wherein the atomic percent of bromine to halogen contained in said quartz arc tube is about 60% to 90%; and a reflector having a predetermined focal length and means capable of being connected to said external power source, wherein said metal halide discharge lamp is positioned within said reflector so as to be approximately disposed near said focal length of said reflector and horizontally positioned within said reflector so that said anode and cathode electrodes substantially coincide with a horizontal axis of said reflector, said cathode electrode is substantially located near said focal length, whereby a light spot generated in said quartz arc tube is substantially positioned near said focal length.

12. A metal halide discharge lamp suitable for an optical light source comprising:

a quartz arc tube;

a pair of electrodes disposed within said tube, said electrodes comprising an anode electrode and a cathode electrode separated from each other by a predetermined distance, wherein a wall load developed in said quartz arc tube is substantially greater than 40 W/cm$^2$;

said quartz arc tube containing an inert gas, mercury and a metal halide fill including at least metal bromine and metal iodine, wherein the atomic percent of bromine to halogen contained in said quartz arc tube is about 60% to 90% and the atomic percent of iodine to halogen other than bromine contained in said quartz arc tube is more than 90%;

said metal bromine including at least one metal bromine selected from the group consisting of dysprosium bromine, tin bromine, indium bromine and thallium bromine, and said metal iodine including at least one metal iodine selected from the group consisting of dysprosium iodine, cesium iodine and neodymium iodine; and means for providing a D.C. potential between said anode and cathode electrodes.

13. A metal halide discharge lamp according to claim 12, wherein said metal halide fill includes at least one metal selected from the group consisting of dysprosium, indium, thallium, neodymium, tin and cesium.

14. A metal halide discharge lamp according to claim 12, wherein said metal bromine of said metal halide fill includes at least dysprosium bromine and tin bromine.

15. A metal halide discharge lamp according to claim 12, wherein said anode electrode has a larger diameter than said cathode electrode.

16. An optical light source comprising:

a metal halide discharge lamp including a quartz arc tube, said quartz arc tube having a pair of electrodes disposed within said tube, said electrodes comprising an anode electrode and a cathode electrode separated from each other by a predetermined distance, wherein a wall load developed in said quartz arc tube is substantially greater than 40 W/cm$^2$, and means for providing a D.C. potential between said anode and cathode electrodes from an external power source therethrough, said quartz arc tube containing an inert gas, mercury and a metal halide fill including at least metal bromine and metal iodine, wherein the atomic percent of bromine to halogen contained in said quartz arc tube is about 60% to 90% and the atomic percent of iodine to halogen other than bromine contained in said quartz arc tube is more than 90%;

said metal bromine including at least one metal bromine selected from the group consisting of dysprosium bromine, tin bromine, indium bromine and thallium bromine, and said metal iodine including at least one metal iodine selected from the group consisting of dysprosium iodine, cesium iodine and neodymium iodine; and a reflector having a predetermined focal length and means capable of being connected to said external power source, wherein said metal halide discharge lamp is positioned within said reflector so as to be approximately disposed near said focal length, and horizontally positioned within said reflector so that said anode and cathode electrodes substantially coincide with a horizontal axis of said reflector.

17. An optical light source according to claim 16, wherein the distance between said anode and cathode electrodes is less than 15 mm and said cathode electrode is substantially located near said focal length, whereby a light spot generated inside said quartz arc tube is substantially positioned near said focal length.

18. An optical light source according to claim 16, wherein said metal halide fill includes at least one metal selected from the group consisting of dysprosium, indium, thallium, neodymium, tin, and cesium.

19. An optical light source according to claim 16, wherein said metal bromine of said metal halide fill includes at least dysprosium bromine and tin bromine.

20. An optical light source according to claim 16, wherein said anode electrode has a larger diameter than said cathode electrode.

21. A color display device having a metal halide discharge lamp as an optical light source including red, green, and blue light components for projecting a color image on a screen comprising:

means for optically filtering the red, green, and blue light components;

means for modulating each of the light components with an image signal and producing modulated signals; and means for optically synthesizing the modulated signals, wherein said metal halide discharge lamp includes;

a quartz arc tubed a pair of electrodes disposed within said tube, said electrodes comprising an anode electrode and a cathode electrode separated from each other by a predetermined distance, wherein a wall load developed in said quartz arc tube is substantially greater than 40 W/cm², said quartz arc tube containing an inert gas, mercury and a metal halide fill including at least metal bromine and metal iodine, wherein the atomic percent of bromine to halogen contained in said quartz arc tube is about 60% to 90% and the atomic percent of iodine to halogen other than bromine contained in said quartz arc tube is more than 90%, said metal bromine including at least one metal bromine selected from the group consisting of dysprosium bromine, tin bromine, indium bromine and thallium bromine, and said metal iodine including at least one metal iodine selected from the group consisting of dysprosium iodine, cesium iodine and neodymium iodine, and means for providing a D.C. potential between said anode and cathode electrodes from an external power source therethrough.

22. A color display device according to claim 21, wherein said metal halide fill of said metal halide discharge lamp includes at least one metal selected from the group consisting of dysprosium, indium, thallium, neodymium, tin, and cesium.

23. A color display device according to claim 21, wherein said metal bromine of said metal halide fill includes at least dysprosium bromine and tin bromine.

24. A color display device according to claim 21, wherein said anode electrode has a larger diameter than said cathode electrode.

* * * * *